United States Patent
Kojima et al.

(10) Patent No.: US 9,994,050 B1
(45) Date of Patent: Jun. 12, 2018

(54) SHEET CONVEYING SYSTEM AND IMAGE FORMING SYSTEM

(71) Applicant: Konica Minolta, Inc., Chiyoda-ku, Tokyo (JP)

(72) Inventors: Kiyoto Kojima, Hachioji (JP); Takahiro Yokoya, Tama (JP); Eiji Nishikawa, Tama (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days. days.

(21) Appl. No.: 15/815,921

(22) Filed: Nov. 17, 2017

(30) Foreign Application Priority Data

Dec. 14, 2016 (JP) .................. 2016-242684

(51) Int. Cl.
| | |
|---|---|
| B65H 7/00 | (2006.01) |
| B41J 11/00 | (2006.01) |
| H04N 1/00 | (2006.01) |
| B65G 43/10 | (2006.01) |
| B65H 7/20 | (2006.01) |

(52) U.S. Cl.
CPC .......... *B41J 11/007* (2013.01); *B41J 11/0045* (2013.01); *H04N 1/0057* (2013.01); *B65G 43/10* (2013.01); *B65H 7/20* (2013.01); *B65H 2557/25* (2013.01)

(58) Field of Classification Search
CPC .... B65H 7/00; B65H 7/20; B65H 2404/1441; B65H 2557/25; B65G 43/10
See application file for complete search history.

(56) References Cited

U.S. PATENT DOCUMENTS

| | | | | | |
|---|---|---|---|---|---|
| 5,228,558 | A | * | 7/1993 | Hall | .......................... H02P 5/50 |
| | | | | | 198/571 |
| 6,873,882 | B2 | * | 3/2005 | Tachibana | ............ B65G 47/261 |
| | | | | | 198/460.1 |
| 7,802,791 | B2 | * | 9/2010 | Yoshizawa | ............... B65H 5/34 |
| | | | | | 271/258.01 |

(Continued)

FOREIGN PATENT DOCUMENTS

| | | |
|---|---|---|
| JP | 3096114 B2 | 10/2000 |
| JP | 4221652 B2 | 2/2009 |

*Primary Examiner* — Howard J Sanders
(74) *Attorney, Agent, or Firm* — Buchanan Ingersoll & Rooney PC

(57) ABSTRACT

A sheet conveying system includes: an upstream apparatus provided on an upstream side in a conveyance direction of a paper sheet; a downstream apparatus provided on a downstream side of the upstream apparatus; an upstream conveyor that conveys the paper sheet; an upstream driver that drives the upstream conveyor; a downstream conveyor that receives the paper sheet conveyed from the upstream conveyor, and conveys the paper sheet received from the upstream conveyor; a downstream driver that drives the downstream conveyor; an upstream controller that is connected to the upstream and downstream drivers; and a downstream controller that is connected to the downstream and upstream drivers, wherein the sheet conveying system switches control on the basis of sheet information between first control in which the upstream controller controls the upstream and downstream drivers and second control in which the downstream controller controls the downstream and upstream drivers.

7 Claims, 6 Drawing Sheets

(56) References Cited

U.S. PATENT DOCUMENTS

| | | | | |
|---|---|---|---|---|
| 8,371,578 B2* | 2/2013 | Ishikawa | B65H 7/06 | |
| | | | 271/226 | |
| 8,413,985 B2* | 4/2013 | Yamazaki | B65H 3/44 | |
| | | | 271/270 | |
| 8,550,234 B2* | 10/2013 | Breen | B65G 43/10 | |
| | | | 198/460.1 | |
| 8,651,020 B2* | 2/2014 | Schnabel | B41F 13/02 | |
| | | | 101/228 | |
| 2011/0241289 A1* | 10/2011 | Yamamoto | B41J 13/0009 | |
| | | | 271/264 | |
| 2013/0274911 A1* | 10/2013 | Imai | B65H 7/20 | |
| | | | 700/117 | |
| 2014/0042694 A1* | 2/2014 | Konishi | B65H 39/00 | |
| | | | 271/279 | |

* cited by examiner

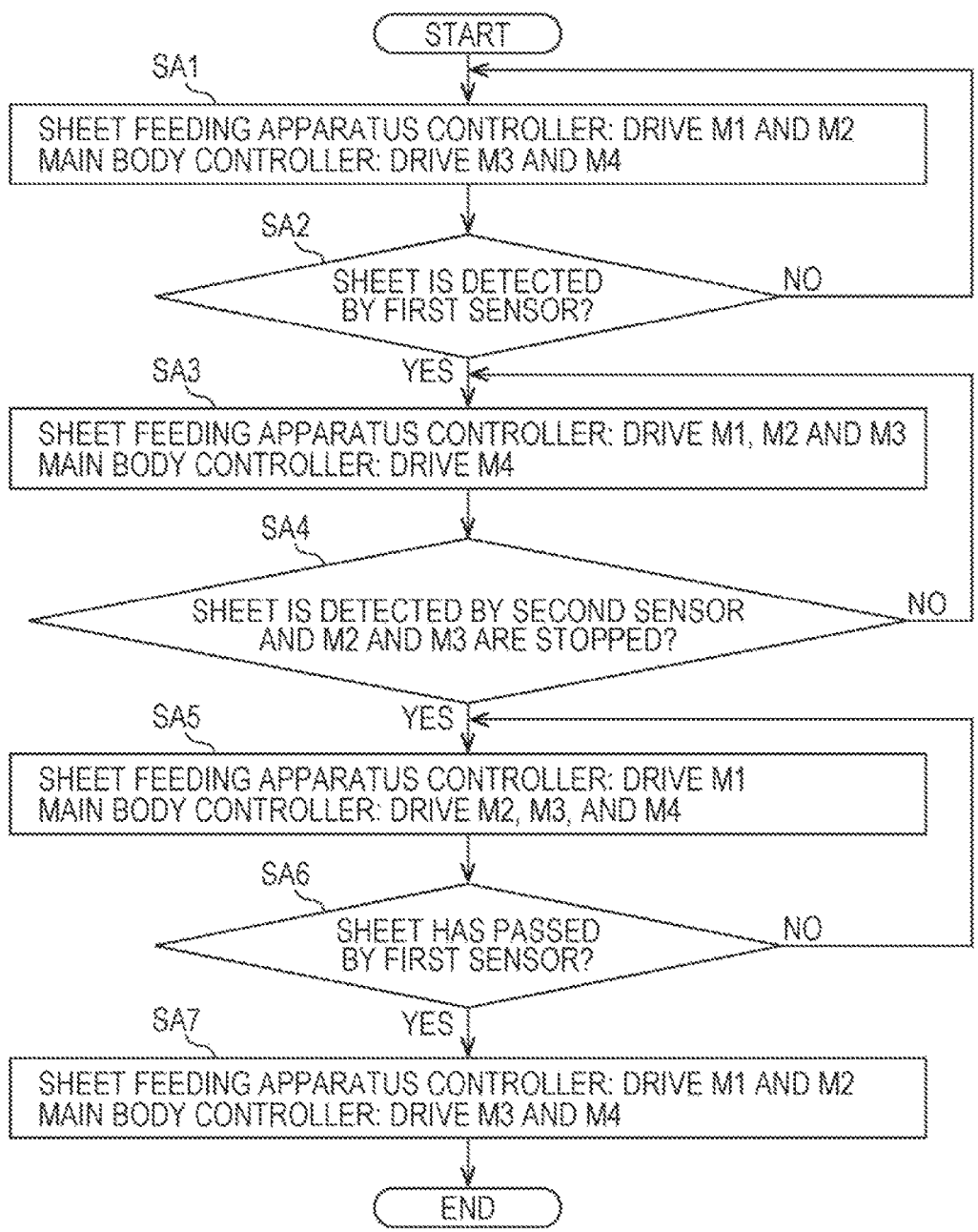

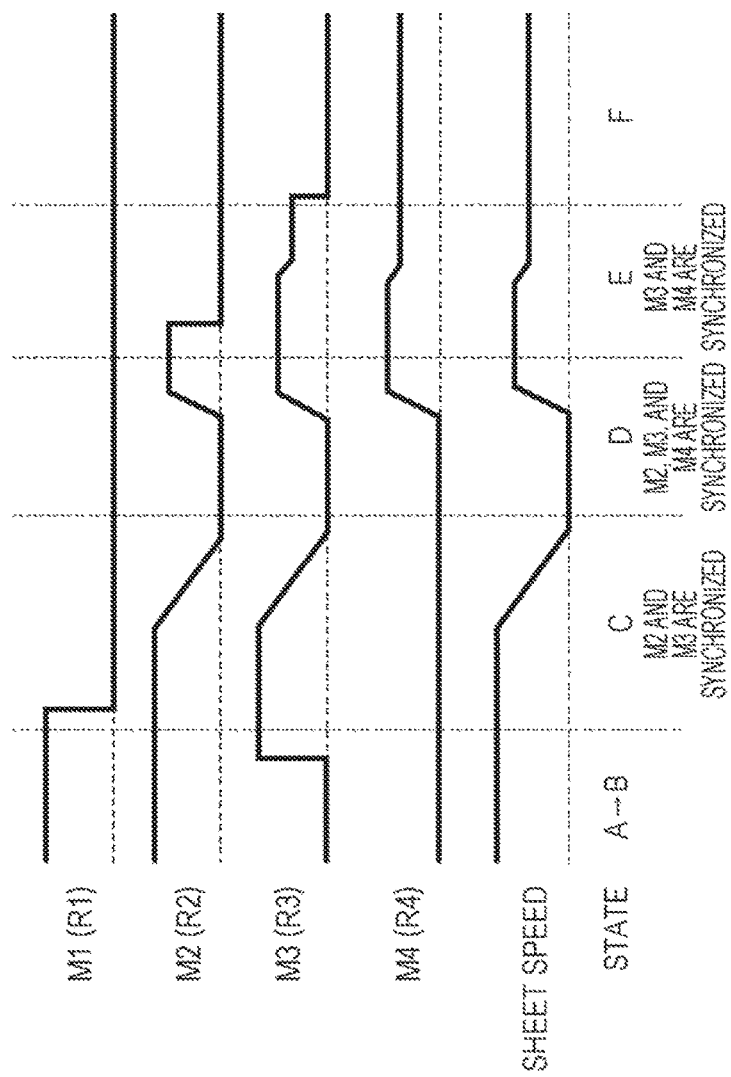

SHEET CONVEYING SYSTEM AND IMAGE FORMING SYSTEM

The entire disclosure of Japanese patent Application No. 2016-242684, filed on Dec. 14, 2016, is incorporated herein by reference in its entirety.

BACKGROUND

Technological Field

The present invention relates to a sheet conveying system and an image forming system in which plural apparatuses are interconnected and which conveys a paper sheet.

Description of the Related Art

As a configuration in which a paper sheet is conveyed by driving a conveying roller by a motor, a technique in which a slave central processing unit (CPU) for motor control is provided in addition to a host CPU and the host CPU controls the motor via the slave CPU by, in response to a trigger command issued by the host CPU, the slave CPU rotating the motor on the basis of acceleration information stored in a built-in random access memory (RAM) has been proposed (for example, see JP 3096114 B2).

In addition, a technique in which a CPU that outputs a motor control command outputs motor selection information together with the motor control command, a CPU interface simultaneously outputs motor control commands to plural pulse generation portions selected in accordance with the motor selection information, and thus plural motors are controlled simultaneously has been proposed (for example, see JP 4221652 B2).

Meanwhile, a system in which plural apparatuses for conveying paper sheets are interconnected has a configuration in which a controller is provided in each of an upstream apparatus and a downstream apparatus, conveying rollers of the upstream apparatus are controlled by the controller of the upstream apparatus, and conveying rollers of the downstream apparatus is controlled by the controller of the downstream apparatus.

In a system in which plural apparatuses for conveying paper sheets are interconnected, in the case of stopping a paper sheet in a state of straddling the upstream apparatus and the downstream apparatus or resuming conveyance of the paper sheet stopped in the state of straddling the upstream apparatus and the downstream apparatus, a conveying roller of the upstream apparatus is driven by the controller of the upstream apparatus and a conveying roller of the downstream apparatus is driven by the controller of the downstream apparatus, and thus it is difficult to synchronize conveyance between these apparatuses.

Also, if the controller of one of the upstream apparatus and the downstream apparatus drives the convey ing rollers via the controller of the other apparatus, a delay occurs and it is difficult to achieve the synchronization.

SUMMARY

The present invention has been made in order to solve such problems, and an object of the present invention is to provide a sheet conveying system and an image forming system in which conveyance of a sheet in an upstream apparatus and conveyance of the sheet in a downstream apparatus can be synchronized in the case where the paper sheet is conveyed in a state of straddling the upstream apparatus and the downstream apparatus.

To achieve the abovementioned object, according to an aspect of the present invention, a sheet conveying system reflecting one aspect of the present invention comprises: an upstream apparatus provided on an upstream side in a conveyance direction of a paper sheet; a downstream apparatus provided on a downstream side of the upstream apparatus in the conveyance direction of the paper sheet; an upstream conveyor that is provided in the upstream apparatus and conveys the paper sheet; an upstream driver that is provided in the upstream apparatus and drives the upstream conveyor; a downstream conveyor that is provided in the downstream apparatus, receives the paper sheet conveyed from the upstream conveyor, and conveys the paper sheet received from the upstream conveyor; a downstream driver that is provided in the downstream apparatus and drives the downstream conveyor; an upstream controller that is provided in the upstream apparatus, connected to the upstream driver via an upstream driving signal line, and connected to the downstream driver via a downstream sub-driving signal line; and a downstream controller that is provided in the downstream apparatus, connected to the downstream driver via a downstream driving signal line, and connected to the upstream driver via an upstream sub-driving signal line, wherein the sheet conveying system switches control on the basis of sheet information between first control in which the upstream controller controls the upstream driver via the upstream driving signal line and the downstream driver via the downstream sub-driving signal line and second control in which the downstream controller controls the downstream driver via the downstream driving signal line and the upstream driver via the upstream sub-driving signal line.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 2 is a flowchart showing an example of an operation of the sheet conveying system according to the embodiment;

FIG. 4 is a timing chart showing an example of an operation of the sheet conveying system according to the embodiment;

DETAILED DESCRIPTION OF EMBODIMENTS

Hereinafter, one or more embodiments of a sheet conveying system and an image forming system according to the present invention will be described with reference to the drawings. However, the scope of the invention is not limited to the disclosed embodiments.

<Exemplary Configuration of Sheet Conveying System and Image Forming System of Present Embodiment>

Figure 1:
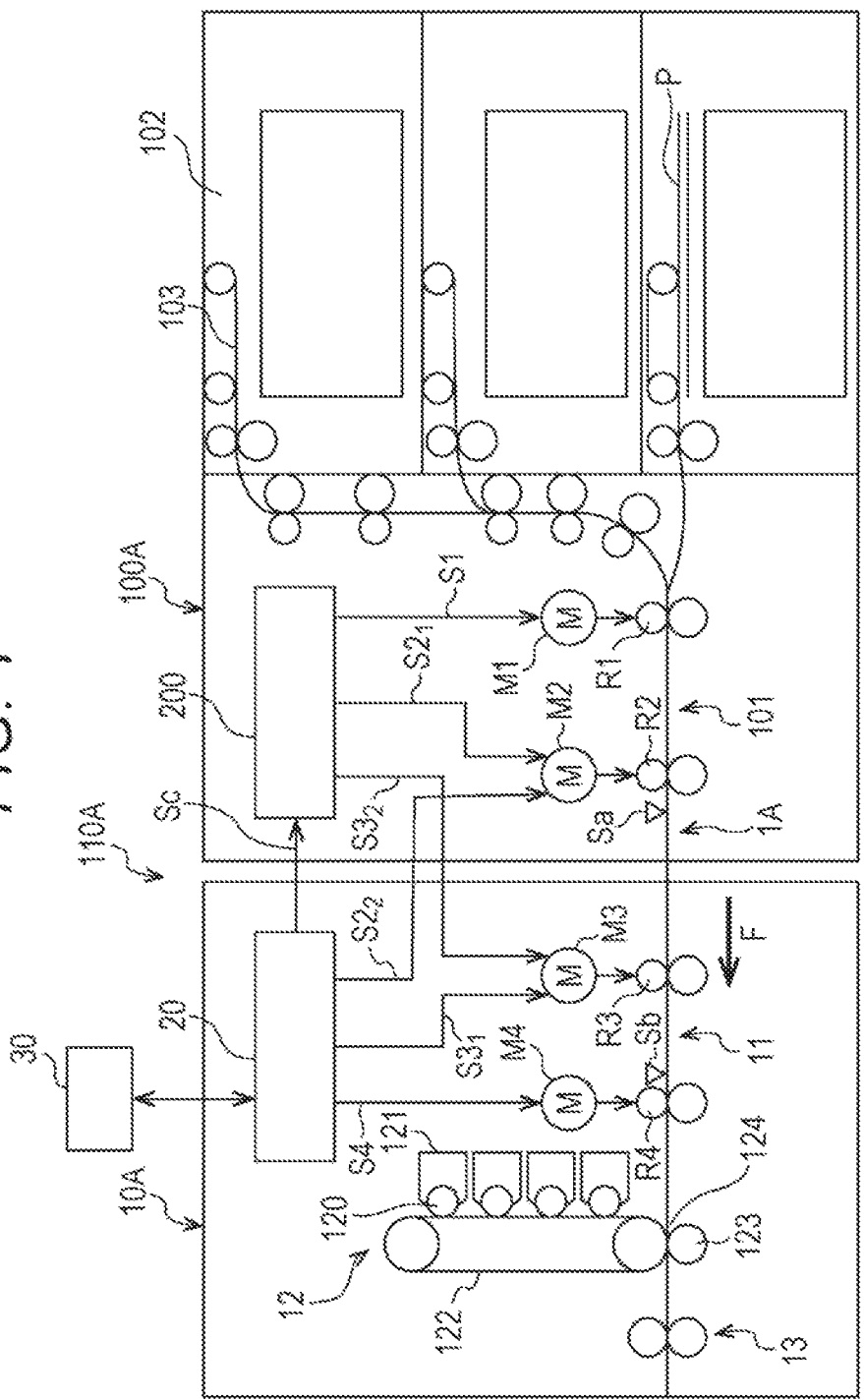
FIG. 1 is a configuration diagram showing an example of a sheet conveying system according to an embodiment.

FIG. 1 is a configuration diagram showing an example of a sheet conveying system of the present embodiment. In this example, in an image forming system 110A including a sheet feeding apparatus 100A, an image forming apparatus 10A, a finishing apparatus that is not illustrated, and so forth, a sheet conveying system 1A of the present embodiment constitutes a conveyance path between the sheet feeding apparatus 100A and the image forming apparatus 10A through which a paper sheet P is conveyed.

The sheet feeding apparatus 100A is an example of an upstream apparatus, and includes a conveyor 101 that conveys a paper sheet P and a single or plural sheet feeding trays 102 that store paper sheets P. The sheet feeding apparatus 100A separates a paper sheet P from the paper sheets P stacked on the sheet feeding tray 102 by using force of air or the like, attracts the separated paper sheet P to a feeding portion such as a conveyance belt 103, and feeds the paper sheet P to the conveyor 101.

The conveyor 101 of the sheet feeding apparatus 100A is provided with plural pairs of rollers that nip and convey the paper sheet P at plural positions along a conveyance direction of the paper sheet P, and is provided with a guide plate that guides conveyance of the paper sheet P. and thus a conveyance path for the paper sheet P is formed.

The image forming apparatus 10A is an example of a downstream apparatus, and includes a conveyor 11 that conveys a paper sheet P, an image forming portion 12 that forms an image on the paper sheet P, a fixing portion 13 that fixes the image on the paper sheet P. The conveyor 11 of the image forming apparatus 10A is provided with plural pairs of rollers that nip and convey the paper sheet P at plural positions along a conveyance direction of the paper sheet P, and is provided with a guide plate that guides conveyance of the paper sheet P, and thus a conveyance path for the paper sheet P is formed.

In this example, the image forming portion 12 forms a toner image on an image bearing member, transfers the toner image onto an intermediate transfer member through primary transfer, and transfers the toner image transferred onto the intermediate transfer member through primary transfer onto the paper sheet P through secondary transfer. Therefore, the image forming portion 12 includes a photosensitive drum 120 which is an image bearing member, a developing device 121, and an intermediate transfer belt 122 which is an intermediate transfer member.

In the image forming portion 12, a latent image is formed by charging the surface of the photosensitive drum 120 in accordance with the image, toner is attached, by the developing device 121, to the latent image formed on the photosensitive drum 120, and thus the latent image is visualized as a toner image. In the image forming portion 12, the toner image formed on the photosensitive drum 120 is transferred onto the intermediate transfer belt 122 through primary transfer, and the toner image transferred onto the intermediate transfer belt 122 through primary transfer is transferred from the intermediate transfer belt 122 onto the paper sheet P through secondary transfer by a transfer portion 124 constituted by the intermediate transfer belt 122 and a transfer roller 123.

The fixing portion 13 is provided on a downstream side of the image forming portion 12 in the conveyance direction of the paper sheet P indicated by an arrow F, and heats and pressurizes the toner image the toner image transferred onto the paper sheet P in the image forming portion 12 to fix the toner image onto the paper sheet P.

In the sheet conveying system 1A, the conveying path constituted by the conveyor 101 of the sheet feeding apparatus 100A and the conveying path constituted by the conveyor 11 of the image forming apparatus 10A are interconnected. The sheet conveying system 1A includes a first conveying roller R1 and a second conveying roller R2 in the conveyor 101 of the sheet feeding apparatus 100A.

In the conveyor 101 of the sheet feeding apparatus 100A, the first conveying roller R1 is provided on an upstream side of the second conveying roller R2 in the conveyance direction of the paper sheet P indicated by the arrow F, and the second conveying roller R2 serving as an upstream conveyor is provided on the most downstream side in the conveyor 101.

In addition, the sheet conveying system 1A includes a third conveying roller R3 and a fourth conveying roller R4 in the conveyor 11 of the image forming apparatus 10A. In the conveyor 11 of the image forming apparatus 10A, the third conveying roller R3 serving as a downstream conveyor is provided on the most upstream side in the conveyance direction of the paper sheet P, and the fourth conveying roller R4 is provided on a downstream side of the third conveying roller R3.

In the image forming apparatus 10A, in a state in which the fourth conveying roller R4 is stopped, the paper sheet P is conveyed by the third conveying roller R3, the leading end of the paper sheet S is caused to abut a nip portion constituted by an abutting portion of a pair of the fourth conveying roller R4, the paper sheet P is conveyed until the paper sheet P takes a warped state that is referred to as "loop", and thus skew of the paper sheet P in a direction along the surface of the paper sheet P is corrected.

Further, in the image forming apparatus 10A, after correcting the skew of the paper sheet P, the fourth conveying roller R4 is rotated along the conveyance direction of the paper sheet P, and thus the paper sheet P is nipped and conveyed in a state in which the skew has been corrected. Further, by moving the fourth conveying roller R4 in a main scanning direction, the position of the paper sheet P in the main scanning direction is corrected. As described above, a series of sheet position correcting operations for correcting the deviation of the position of the paper sheet P in the main scanning direction is referred to as registration swing. Therefore, the third conveying roller R3 is also referred to as a hoop roller, and the fourth conveying roller R4 is also referred to as a registration roller.

In the sheet conveying system 1A, when the trailing end of the paper sheet P conveyed by the first conveying roller R1 and the second conveying roller R2 passes by the first conveying roller R1, the paper sheet P is conveyed by the second conveying roller R2 and is output from the sheet feeding apparatus 100A to the image forming apparatus 10A.

In the sheet conveying system 1A, before the trailing end of the paper sheet P conveyed by the second conveying roller R2 passes by the second conveying roller R2, the leading end of the paper sheet P is nipped by the third conveying roller R3.

In addition, in the sheet conveying system 1A, when the length of the paper sheet P in the conveyance direction exceeds a predetermined length, before the trailing end of the paper sheet P passes by the second conveying roller R2, the leading end of the paper sheet P reaches the fourth conveying roller R4 and a loop is formed.

Further, when the length of the paper sheet P in the conveyance direction is equal to or smaller than the predetermined length, after the trailing end of the paper sheet P passes by the second conveying roller R2, the leading end of the paper sheet P reaches the fourth conveying roller R4 and a loop is formed. A paper sheet P whose length in the conveyance direction exceeds the predetermined length is also referred to as a long paper sheet, and a paper sheet P whose length in the conveyance direction is equal to or smaller than the predetermined length is simply referred to as a paper sheet.

As a result, in the sheet conveying system 1A, in either case where the paper sheet P input from the sheet feeding apparatus 100A to the image forming apparatus 10A is a long paper sheet or a paper sheet, the paper sheet P straddles the sheet feeding apparatus 100A and the image forming apparatus 10A, and is conveyed by the second conveying roller R2 of the sheet feeding apparatus 100A and the third conveying roller R3 of the image forming apparatus 10A.

When the paper sheet P conveyed by the second conveying roller R2 and the third conveying roller R3 across the sheet feeding apparatus 100A and the image forming apparatus 10A is a long paper sheet, the leading end of the long paper sheet reaches the fourth conveying roller R4 of the image forming apparatus 10A before the trailing end of the long paper sheet passes by the second conveying roller R2, and thus a loop is formed.

As a result, the decelerated long paper sheet at the time of forming a loop and conveyance thereof being stopped is conveyed by the second conveying roller R2 of the sheet feeding apparatus 100A and the third conveying roller R3 of the image forming apparatus 10A. In addition, the accelerated long paper sheet at the time of resuming the conveyance thereof after forming the loop is conveyed by the second conveying roller R2 of the sheet feeding apparatus 100A and the third conveying roller R3 and the fourth conveying roller R4 of the image forming apparatus 10A.

Meanwhile, when the paper sheet P conveyed by the second conveying roller R2 and the third conveying roller R3 across the sheet feeding apparatus 100A and the image forming apparatus 10A is a paper sheet, the leading end of the paper sheet P reaches the fourth conveying roller R4 after the trailing end of the paper sheet P passes by the second conveying roller R2, and thus a loop is formed.

As a result, the decelerated paper sheet at the time of forming a loop and conveyance thereof being stopped is conveyed by the third conveying roller R3 of the image forming apparatus 10A. In addition, the accelerated paper sheet at the time of resuming the conveyance thereof after forming the loop is conveyed by the third conveying roller R3 and the fourth conveying roller R4 of the image forming apparatus 10A.

In the sheet conveying system 1A, the sheet feeding apparatus 100A includes a first motor M1 that drives the first conveying roller R1 and a second motor M2 serving as an example of an upstream driver that drives the second conveying roller R2. In addition, in the sheet conveying system 1A, the image forming apparatus 10A includes a third motor M3 serving as an example of a downstream driver that drives the third conveying roller R3 and a fourth motor M4 serving that drives the fourth conveying roller R4. Since each motor can control the rotation angle, each motor is preferably a stepping motor.

Further, in the sheet conveying system 1A, the sheet feeding apparatus 100A includes a first sensor Sa that detects the paper sheet P, and the image forming apparatus 10A includes a second sensor Sb. The first sensor Sa is provided on a downstream side of the second conveying roller R2 in the conveyance direction of the paper sheet P. The second sensor Sb is provided upstream of the fourth conveying roller R4 and downstream of the third conveying roller R3 in the vicinity of the fourth conveying roller R4 in the conveyance direction of the paper sheet P.

The image forming apparatus 10A includes a main body controller 20 serving as an example of a downstream controller that controls the third motor M3, the fourth motor M4, and the like. In addition, the sheet feeding apparatus 100A includes a sheet feeding apparatus controller 200 serving as an example of an upstream controller that controls the first motor M1, the second motor M2, and the like.

In the sheet conveying system 1A, the first motor M1 provided in the sheet feeding apparatus 100A is driven by the sheet feeding apparatus controller 200. In addition, the second motor M2 provided in the sheet feeding apparatus 100A is driven by the sheet feeding apparatus controller 200 or the main body controller 20.

The third motor M3 provided in the image forming apparatus 10A is driven by the main body controller 20 or the sheet feeding apparatus controller 200. Further, the fourth motor M4 provided in the image forming apparatus 10A is driven by the main body controller 20.

Therefore, the sheet feeding apparatus controller 200 is connected to the first motor M1 of the sheet feeding apparatus 100A via a driving signal line S1, and drives the first motor M1. In addition, the sheet feeding apparatus controller 200 is connected to the second motor M2 of the sheet feeding apparatus 100A via a driving signal line $S2_1$ serving as an example of an upstream driving signal line, and drives the second motor M2. Further, the sheet feeding apparatus controller 200 is connected to the third motor M3 of the image forming apparatus 10A via a driving signal line $S3_2$ serving as an example of a downstream sub-driving signal line, and directly drives the third motor M3 not through the main body controller 20.

The main body controller 20 is connected to the third motor M3 of the image forming apparatus 10A via a driving signal line $S3_1$ serving as an example of a downstream sub-driving signal line, and drives the third motor M3. In addition, the main body controller 20 is connected to the fourth motor M4 of the image forming apparatus 10A via a driving signal line S4, and drives the fourth motor M4. Further, the main body controller 20 is connected to the second motor M2 of the sheet feeding apparatus 100A via a driving signal line $S2_2$ serving as an example of an upstream sub-driving signal line, and directly drives the second motor M2 not through the sheet feeding apparatus controller 200.

The main body controller 20 determines, on the basis of sheet information such as the size of the paper sheet P set by an operation portion 30, whether to drive the second motor M2 by the sheet feeding apparatus controller 200 or by the main body controller 20. In addition, the main body controller 20 determines whether to drive the third motor M3 by the sheet feeding apparatus controller 200 or by the main body controller 20.

Further, on the basis of the position of the paper sheet P conveyed in the sheet feeding apparatus 100A and detected by the first sensor Sa, the main body controller 20 determines a timing for switching the drive of the third conveying roller R3 from by the main body controller 20 to by the sheet feeding apparatus controller 200. In addition, on the basis of the position of the paper sheet P conveyed in the image forming apparatus 10A and detected by the second sensor Sb, the main body controller 20 determines a timing for switching the drive of the second conveying roller R2 from by the sheet feeding apparatus controller 200 to by the main body controller 20 and a timing for switching the drive of the second conveying roller R2 from by the main body controller 20 to by the sheet feeding apparatus controller 200.

The main body controller 20 is connected to the sheet feeding apparatus controller 200 via a control signal line Sc. In the case where the main body controller 20 has determined that the sheet feeding apparatus controller 200 drives the second motor M2 and the main body controller 20 drives the third motor M3, the main body controller 20 outputs a control signal for causing the sheet feeding apparatus controller 200 to drive the first motor M1 and the second motor M2 to the sheet feeding apparatus controller 200 through the control signal line Sc.

In the case where the second motor M2 is driven by the sheet feeding apparatus controller 200 and the third motor M3 is driven by the main body controller 20, the sheet feeding apparatus controller 200 outputs a driving signal for driving the first motor M1 to the first motor M1 through the driving signal line S1, and thus drives the first motor M1. In addition, the sheet feeding apparatus controller 200 outputs a driving signal for driving the second motor M2 to the second motor M2 through the driving signal line $S2_1$, and thus drives the second motor M2.

The main body controller 20 outputs a driving signal for driving the third motor M3 to the third motor M3 through the driving signal line $S3_1$, and thus drives the third motor M3. In addition, the main body controller 20 outputs a driving signal for driving the fourth motor M4 to the fourth motor M4 through the driving signal line S4, and thus drives the fourth motor M4. The sheet feeding apparatus controller 200 does not output a driving signal for driving the third motor M3. In addition, the main body controller 20 does not output a driving signal for driving the second motor M2.

In the case where the main body controller 20 has determined that the sheet feeding apparatus controller 200 drives the second motor M2 and the third motor M3, the main body controller 20 outputs a control signal for causing the sheet feeding apparatus controller 200 to drive the first motor M1, the second motor M2, and the third motor M3 to the sheet feeding apparatus controller 200 through the control signal line Sc.

In the case where the second motor M2 and the third motor M3 are driven by the sheet feeding apparatus controller 200, the sheet feeding apparatus controller 200 outputs a driving signal for driving the first motor M1 to the first motor M1 through the driving signal line S1, and thus drives the first motor M1. In addition, the sheet feeding apparatus controller 200 outputs a driving signal for driving the second motor M2 to the second motor M2 through the driving signal line $S2_1$, and thus drives the second motor M2. Further, the sheet feeding apparatus controller 200 outputs a driving signal for driving the third motor M3 to the third motor M3 through the driving signal line $S3_2$, and thus drives the third motor M3.

The main body controller 20 outputs a driving signal for driving the fourth motor M4 to the fourth motor M4 through the driving signal line S4, and thus drives the fourth motor M4. The main body controller 20 does not output a driving signal for driving the third motor M3. In addition, the main body controller 20 does not output a driving signal for driving the second motor M2.

In the case where the main body controller 20 has determined that the main body controller 20 drives the second motor M2 and the third motor M3, the main body controller 20 outputs a control signal for causing the sheet feeding apparatus controller 200 to drive the first motor M1 and to not drive the second motor M2 to the sheet feeding apparatus controller 200 through the control signal line Sc.

In the case where the second motor M2 and the third motor M3 are driven by the main body controller 20, the sheet feeding apparatus controller 200 outputs a driving signal for driving the first motor M1 to the first motor M1 through the driving signal line S1, and thus drives the first motor M1. The sheet feeding apparatus controller 200 does not output a driving signal for driving the second motor M2. In addition, the sheet feeding apparatus controller 200 does not output a driving signal for driving the third motor M3.

The main body controller 20 outputs a driving signal for driving the second motor M2 to the second motor M2 through the driving signal line $S2_2$, and thus drives the second motor M2. In addition, the main body controller 20 outputs a driving signal for driving the third motor M3 to the third motor M3 through the driving signal line $S3_1$, and thus drives the third motor M3. Further, the main body controller 20 outputs a driving signal for driving the fourth motor M4 to the fourth motor M4 through the driving signal line S4, and thus drives the fourth motor M4.

<Exemplary Operation of Sheet Conveying System and Image Forming System of Present Embodiment>

FIG. 2 is a flowchart showing an example of an operation of the sheet conveying system of the present embodiment, FIGS. 3A to 3F are each a diagram for explaining an operation showing an example of the operation of the sheet conveying system of the present embodiment, and FIG. 4 is a timing chart showing an example of an operation of the sheet conveying system according to the embodiment.

First, the processing in the case of conveying a long paper sheet as the paper sheet P will be described with reference to corresponding drawings. In the case where the main body controller 20 has determined that the paper sheet P is a long paper sheet P1 on the basis of sheet information such as the size of the paper sheet P set via the operation portion 30, the main body controller 20 switches the drive of the third conveying roller R3 to be performed under the control of the sheet feeding apparatus controller 200 at a predetermined timing, and thus synchronizes the first conveying roller R1, the second conveying roller R2, and the third conveying roller R3. In addition, the main body controller 20 switches the drive of the second conveying roller R2 to be performed under the control of the main body controller 20 at a predetermined timing, and thus synchronizes the second conveying roller R2, the third conveying roller R3, and the fourth conveying roller R4.

Figure 3A:
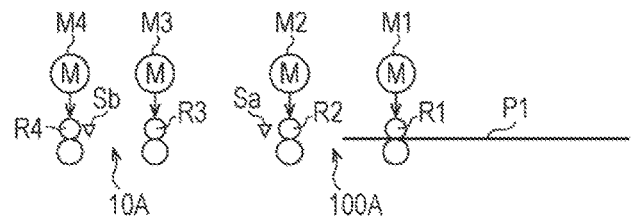
FIGS. 3A to 3F are each a diagram for explaining an operation showing an example of the operation of the sheet conveying system according to the embodiment.

That is, in step SA1 of FIG. 2 and FIG. 3A, the first motor M1 that drives the first conveying roller R1 and the second motor M2 that drives the second conveying roller R2 are controlled by the sheet feeding apparatus controller 200 shown in FIG. 1. In addition, the third motor M3 that drives the third conveying roller R3 and the fourth motor M4 that drives the fourth conveying roller R4 are controlled by the main body controller 20.

As described above, the sheet feeding apparatus controller 200 controls the first motor M1 to drive the first conveying roller R1 and controls the second motor M2 to drive the second conveying roller R2, and thus the long paper sheet P1 is conveyed. As shown in FIG. 4, in the state of FIG. 3A, the third conveying roller R3 and the fourth conveying roller R4 are stopped.

Figure 3B:
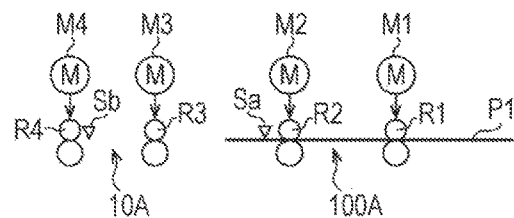

As shown in FIG. 3B, when the leading end of the long paper sheet P1 is conveyed to a position where the leading end of the long paper sheet P1 passes by the first sensor Sa and the long paper sheet P1 is detected by the first sensor Sa in step SA2 of FIG. 2, the drive of the third conveying roller R3 is switched to be performed under the control of the sheet feeding apparatus controller 200 in step SA3 of FIG. 2. In the case where the switching of conveying rollers controlled by the controlled by the main body controller 20 and the sheet feeding apparatus controller 200 is performed while the conveying rollers to be switched are stopped, there is no influence such as fluctuation of the rotational speed of the conveying rollers.

Accordingly, the sheet feeding apparatus controller 200 controls the drive of the first conveying roller R1, the second conveying roller R2, and the third conveying roller R3, and the main body controller 20 controls the drive of the fourth conveying roller R4. The sheet feeding apparatus controller 200 directly controls the drive of the third conveying roller R3 through the driving signal line $S3_2$ shown in FIG. 1, and thus the third conveying roller R3 is driven in synchronization with the first conveying roller R1 and the second conveying roller R2 to convey the long paper sheet P1. In the state of FIG. 3B, the fourth conveying roller R4 is stopped.

After the trailing end of the long paper sheet P1 has passed by the first conveying roller R1, the drive of the first conveying roller R1 is stopped. In addition, in the case where the long paper sheet P1 is detected by the second sensor Sb in step SA4 of FIG. 2, deceleration of the second conveying roller R2 and the third conveying roller R3 is started, and the drive thereof is stopped.

Figure 3C:
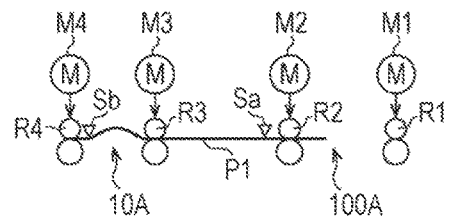

As described above, the long paper sheet P1 is conveyed by a predetermined amount by the second conveying roller R2 and the third conveying roller R3 with the fourth conveying roller R4 stopped, the leading end of the long paper sheet P1 is caused to abut a nip portion constituted by an abutting portion of a pair of the fourth conveying roller R4, and thus a loop of the long paper sheet P1 is formed between the third conveying roller R3 and the fourth conveying roller R4 as shown in FIG. 3C.

The decelerated long paper sheet P1 at the time of forming a loop and conveyance thereof being stopped is conveyed by the second conveying roller R2 of the sheet feeding apparatus 100A and the third conveying roller R3 of the image forming apparatus 10A. In the case of the long paper sheet P1, the conveyance thereof is stopped while the long paper sheet P1 is straddling the sheet feeding apparatus 100A and the image forming apparatus 10A. However, as a result of the third conveying roller R3 of the image forming apparatus 10A being controlled by the sheet feeding apparatus controller 200, the timings of deceleration and stop of the second conveying roller R2 and the third conveying roller R3 are synchronized. As a result of this, pulling and loosening of the long paper sheet P1 are suppressed.

Figure 3D:
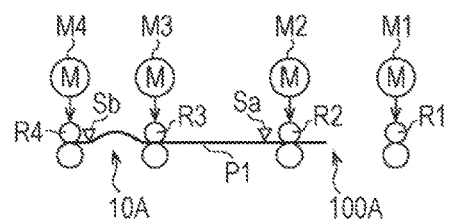

When the conveyance of the long paper sheet P1 is stopped in the state of FIG. 3C, the drive of the second conveying roller R2 and the third conveying roller R3 is switched to be performed under the control of the main body controller 20 in step SA5 of FIG. 2. Accordingly, as shown in FIG. 3D, the sheet feeding apparatus controller 200 controls the drive of the first conveying roller R1, and the main body controller 20 controls the drive of the second conveying roller R2, the third conveying roller R3, and the fourth conveying roller R4.

The main body controller 20 controls the drive of the third conveying roller R3 through the driving signal line $S3_1$ shown in FIG. 1, and directly controls the drive of the second conveying roller R2 through the driving signal line $S2_2$ shown in FIG. 1, and thus the second conveying roller R2 is driven in synchronization with the third conveying roller R3 and the fourth conveying roller R4 to resume the conveyance of the long paper sheet P1. In the state of FIG. 3D, the first conveying roller R1 is stopped.

The accelerated long paper sheet P1 at the time of resuming the conveyance thereof after forming the loop is conveyed by the second conveying roller R2 of the sheet feeding apparatus 100A and the third conveying roller R3 and the fourth conveying roller R4 of the image forming apparatus 10A. In the case of the long paper sheet P1, the conveyance thereof is resumed from the state in which the long paper sheet P1 is straddling the sheet feeding apparatus 100A and the image forming apparatus 10A. However, as a result of the second conveying roller R2 of the sheet feeding apparatus 100A being controlled by the main body controller 20, the timings of acceleration of the second conveying roller R2, the third conveying roller R3, and the fourth conveying roller R4 are synchronized. As a result of this, pulling and loosening of the long paper sheet P1 are suppressed.

Figure 3E:
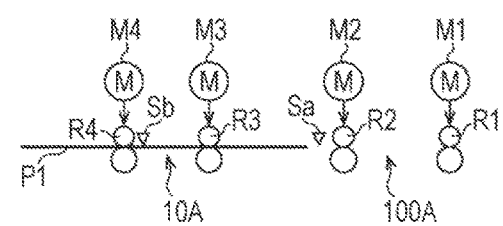

In step SA6 of FIG. 2, when the leading end of the long paper sheet P1 having passed by the first sensor Sa is detected, the drive of the second conveying roller R2 is stopped, and the drive of the second conveying roller R2 is switched to be performed under the control of the sheet feeding apparatus controller 200 in step SA7 of FIG. 2. Accordingly, as shown in FIG. 3E, the sheet feeding apparatus controller 200 controls the drive of the first conveying roller R1 and the second conveying roller R2, and the main body controller 20 controls the drive of the third conveying roller R3 and the fourth conveying roller R4.

Figure 3F:
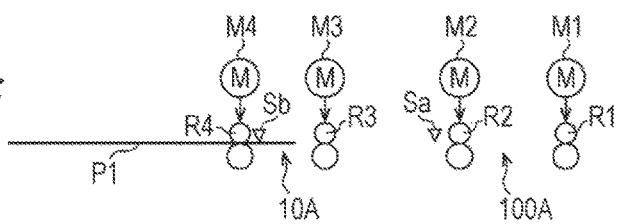

As shown in FIG. 3F, in the case where the trailing end of the long paper sheet P1 has passed by the third conveying roller R3, the drive of the third conveying roller R3 is stopped. Then the long paper sheet P1 is conveyed to the image forming portion 12 shown in FIG. 1 by the fourth conveying roller R4, and image formation is performed on the long paper sheet P1 whose skew and position in the main scanning direction have corrected by the registration swing.

Figure 5A:
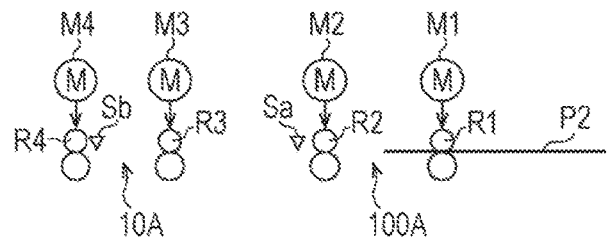
FIGS. 5A to 5F are each a diagram for explaining an operation showing an example of the operation of the sheet conveying system according to the embodiment.
Figure 5B:
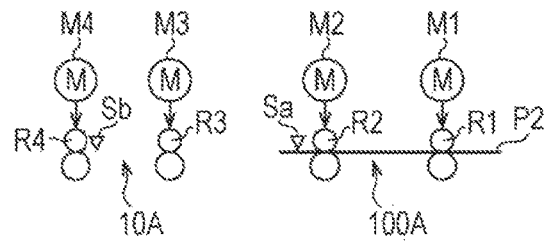
Figure 5C:
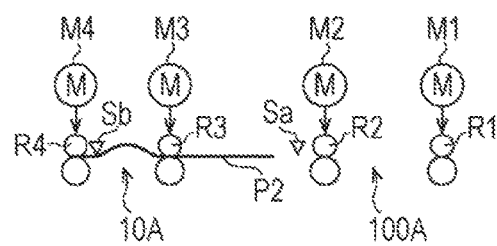
Figure 5D:
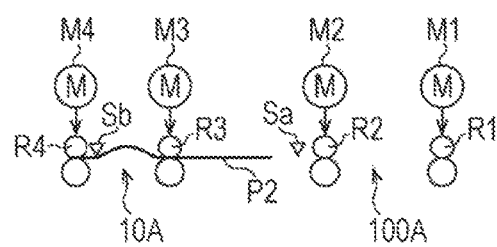
Figure 5E:
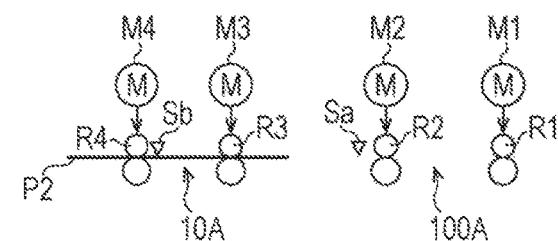
Figure 5F:
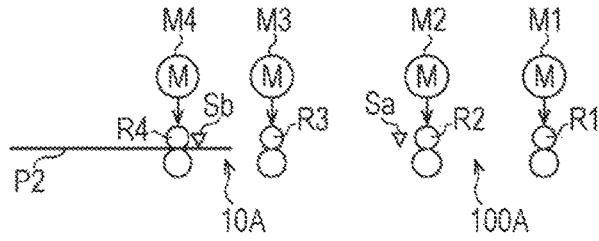
Figure 6:
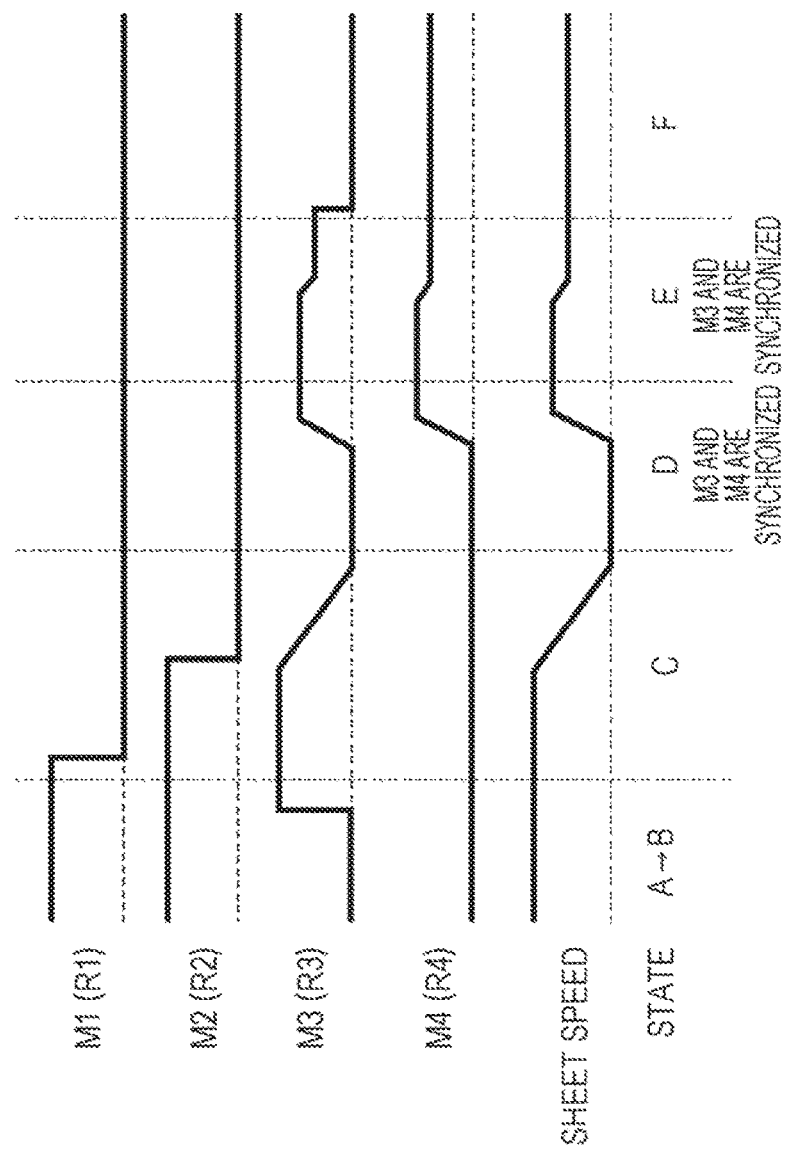
FIG. 6 is a timing chart showing an example of an operation of the sheet conveying system according to the embodiment.

FIGS. 5A to 5F are each a diagram for explaining an operation showing an example of the operation of the sheet conveying system of the present embodiment, and FIG. 6 is a timing chart showing an example of an operation of the sheet conveying system according to the embodiment.

Next, the processing in the case of conveying a paper sheet as the paper sheet P will be described with reference to corresponding drawings. In the case where the main body controller 20 has determined that the paper sheet P is a paper sheet P2 on the basis of sheet information such as the size of the paper sheet P set via the operation portion 30, the sheet feeding apparatus controller 200 controls the drive of the first conveying roller R1 and the second conveying roller R2, and the main body controller 20 controls the drive of the third conveying roller R3 and the fourth conveying roller R4 in FIG. 5A. Then the first conveying roller R1 and the second conveying roller R2 are driven to convey the paper sheet P2. As shown in FIG. 6, in the state of FIG. 5A, the third conveying roller R3 and the fourth conveying roller R4 are stopped.

As shown in FIG. 5B, in the case where the leading end of the paper sheet P2 has been conveyed to a position where the leading end of the paper sheet P2 passes by the first sensor Sa and the paper sheet P2 is detected by the first sensor Sa, the third conveying roller R3 is driven. Since the second conveying roller R2 and the third conveying roller R3 need only be synchronized before the leading end of the paper sheet P2 conveyed by the second conveying roller R2 reaches the third conveying roller R3, the paper sheet P2 is not pulled or loosened even in the case where the second conveying roller R2 is controlled by the sheet feeding apparatus controller 200 and the third conveying roller R3 is controlled by the main body controller 20. In the state of FIG. 5B, the fourth conveying roller R4 is stopped.

After the trailing end of the paper sheet P2 has passed by the first conveying roller R1, the drive of the first conveying roller R1 is stopped. In addition, after the trailing end of the paper sheet P2 has passed by the second conveying roller R2, the drive of the second conveying roller R2 is stopped.

Further, in the case where the paper sheet P2 is detected by the second sensor Sb, deceleration of the third conveying roller R3 is started, and the drive thereof is stopped.

As described above, the paper sheet P2 is conveyed by a predetermined amount by the third conveying roller R3 with the fourth conveying roller R4 stopped, the leading end of the paper sheet P2 is caused to abut a nip portion constituted by an abutting portion of a pair of the fourth conveying roller R4, and thus a loop of the paper sheet P2 is formed between the third conveying roller R3 and the fourth conveying roller R4 as shown in FIG. 5C.

The trailing end of the decelerated paper sheet P2 at the time of forming a loop and conveyance thereof being stopped has passed by the second conveying roller R2, and the paper sheet P2 is conveyed by the third conveying roller R3 of the image forming apparatus 10A. Therefore, there is no need to synchronize the second conveying roller R2 of the sheet feeding apparatus 100A with the third conveying roller R3 of the image forming apparatus 10A.

After forming a loop of the paper sheet P2 and stopping the conveyance thereof, the third conveying roller R3 and the fourth conveying roller R4 are driven to resume the conveyance of the paper sheet P2 in FIG. 5D. In the state of FIG. 5D, the first conveying roller R1 and the second conveying roller R2 are stopped.

The accelerated paper sheet P2 at the time of resuming the conveyance thereof after forming the loop is conveyed by the third conveying roller R3 and the fourth conveying roller R4 of the image forming apparatus 10A as shown in FIG. 5E. Therefore, there is no need to synchronize the second conveying roller R2 of the sheet feeding apparatus 100A with the third conveying roller R3 of the image forming apparatus 10A.

As shown in FIG. 5F, in the case where the trailing end of the paper sheet P2 has passed by the third conveying roller R3, the drive of the third conveying roller R3 is stopped. Then, the paper sheet P2 is conveyed to the image forming portion 12 shown in FIG. 1 by the fourth conveying roller R4, and image formation is performed on the paper sheet P2 whose skew and position in the main scanning direction have been corrected by the registration swing.

The present invention may be applied to an image forming system in which a long paper sheet of a length large enough to stop in a state of straddling devices in the middle of processing is conveyed.

Although embodiments of the present invention have been described and illustrated in detail, the disclosed embodiments are made for purposes of illustration and example only and not limitation. The scope of the present invention should be interpreted by terms of the appended claims.

What is claimed is:

1. A sheet conveying system comprising:
an upstream apparatus provided on an upstream side in a conveyance direction of a paper sheet;
a downstream apparatus provided on a downstream side of the upstream apparatus in the conveyance direction of the paper sheet;
an upstream conveyor that is provided in the upstream apparatus and conveys the paper sheet;
an upstream driver that is provided in the upstream apparatus and drives the upstream conveyor;
a downstream conveyor that is provided in the downstream apparatus, receives the paper sheet conveyed from the upstream conveyor, and conveys the paper sheet received from the upstream conveyor;
a downstream driver that is provided in the downstream apparatus and drives the downstream conveyor;
an upstream controller that is provided in the upstream apparatus, connected to the upstream driver via an upstream driving signal line, and connected to the downstream driver via a downstream sub-driving signal line; and
a downstream controller that is provided in the downstream apparatus, connected to the downstream driver via a downstream driving signal line, and connected to the upstream driver via an upstream sub-driving signal line,
wherein the sheet conveying system switches control on the basis of sheet information between
first control in which the upstream controller controls the upstream driver via the upstream driving signal line and the downstream driver via the downstream sub-driving signal line and
second control in which the downstream controller controls the downstream driver via the downstream driving signal line and the upstream driver via the upstream sub-driving signal line.

2. The sheet conveying system according to claim 1, wherein the upstream driver and the downstream driver are each a motor, and
the sheet conveying system switches the control between the first control and the second control on the basis of a size and a position of the paper sheet in the conveyance direction serving as the sheet information.

3. The sheet conveying system according to claim 2, wherein the sheet conveying system switches the control to the first control before the paper sheet conveyed from the upstream apparatus to the downstream apparatus reaches the downstream conveyor and drive of the upstream conveyor and the downstream conveyor is stopped, and switches the control to the second control before resuming conveyance of the paper sheet.

4. The sheet conveying system according to claim 3, wherein the sheet conveying system synchronizes a conveyance speed of the paper sheet in the upstream conveyor and a conveyance speed of the paper sheet in the downstream conveyor after the upstream conveyor starts conveyance of the paper sheet and before the paper sheet conveyed from the upstream apparatus to the downstream apparatus reaches the downstream conveyor.

5. The sheet conveying system according to claim 3, wherein the sheet conveying system performs the first control at a timing at which the paper sheet conveyed from the upstream apparatus to the downstream apparatus has reached the downstream conveyor and the drive of the upstream conveyor and the downstream conveyor is stopped.

6. The sheet conveying system according to claim 3, wherein the sheet conveying system performs the second control at a timing at which conveyance is resumed after the paper sheet conveyed from the upstream apparatus to the downstream apparatus has reached the downstream conveyor and the drive of the upstream conveyor and the downstream conveyor has been stopped.

7. An image forming system comprising:
an image forming apparatus that forms an image on a paper sheet;
a sheet feeding apparatus that is provided on an upstream side of the image forming apparatus in a conveyance direction of the paper sheet and supplies the paper sheet to the image forming apparatus;

an upstream conveyor that is provided in the sheet feeding apparatus and conveys the paper sheet;

an upstream driver that is provided in the sheet feeding apparatus and drives the upstream conveyor;

a downstream conveyor that is provided in the image forming apparatus, receives the paper sheet conveyed from the upstream conveyor, and conveys the paper sheet received from the upstream conveyor;

a downstream driver that is provided in the image forming apparatus and drives the downstream conveyor;

an upstream controller that is provided in the sheet feeding apparatus, connected to the upstream driver via an upstream driving signal line, and connected to the downstream driver via a downstream sub-driving signal line; and a downstream controller that is provided in the image forming apparatus, connected to the downstream driver via a downstream driving signal line, and connected to the upstream driver via an upstream sub-driving signal line, wherein the image forming system switches control on the basis of paper sheet information between first control in which the upstream controller controls the upstream driver via the upstream driving signal line and the downstream driver via the downstream sub-driving signal line and second control in which the downstream controller controls the downstream driver via the downstream driving signal line and the upstream driver via the upstream sub-driving signal line.

* * * * *